Nov. 30, 1954
W. J. McCARTHY
2,695,797
PIPE AND HOSE COUPLING
Filed June 21, 1950
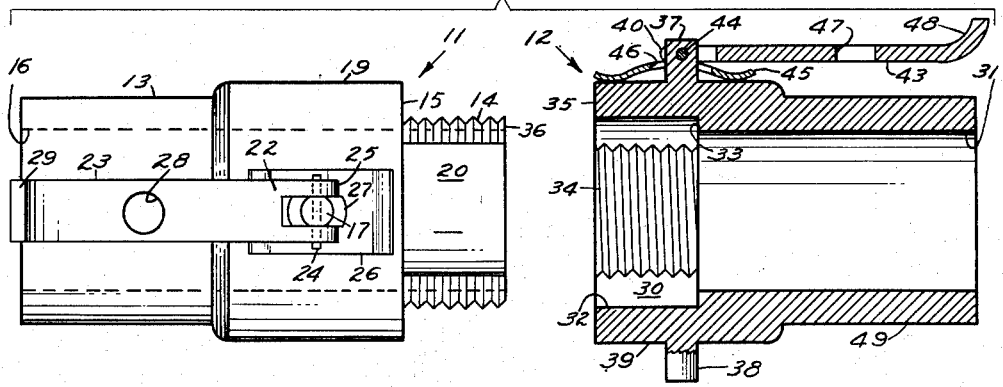
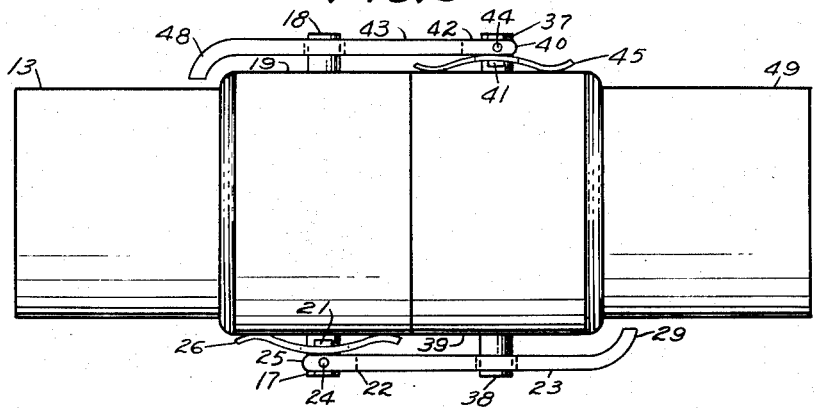
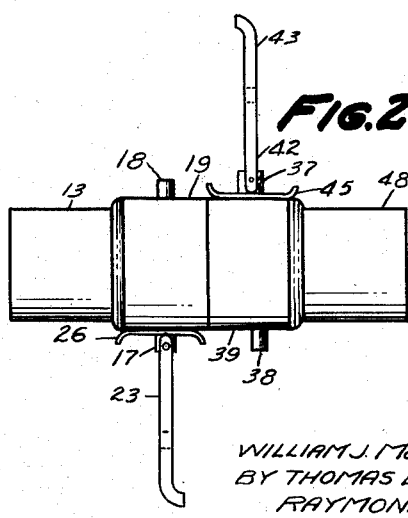
INVENTOR.
WILLIAM J. McCARTHY, DECEASED,
BY THOMAS E. McCARTHY AND
RAYMOND L. McCARTHY,
ADMINISTRATORS,
BY Stanley Sinish
ATTORNEY.

United States Patent Office 2,695,797
Patented Nov. 30, 1954

2,695,797

PIPE AND HOSE COUPLING

William J. McCarthy, deceased, late of Chadron, Nebr., by Thomas E. McCarthy, Green Bay, Wis., and Raymond L. McCarthy, Chicago, Ill., administrators Application June 21, 1950, Serial No. 169,321

1 Claim. (Cl. 285—149)

This invention relates to pipe and hose couplings, and in particular to the fast coupling and uncoupling type having interengaging threads or ribs.

It is an object of this invention to provide a hose coupling that may be rapidly coupled and uncoupled without the use of a spanner wrench or the like usually used for screwing coupling members into tight engagement with each other.

It is another object of this invention to provide a hose coupling having associated torque applying means, on the complementary parts of said coupling, which also serve as coupling locking members.

It is still another object of this invention to provide a hose coupling with coupling locking means that is self-securing against unlocking.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Fig. 1 shows the disengaged complementary parts of the coupling, one part being shown in side elevational view, and the other in longitudinal sectional view;

Fig. 2 is an assembled view of the complementary parts of the coupling showing the handles in extended position for the application of a tightening torque thereto; and Fig. 3 is an assembly of the complementary parts of the coupling showing the handles in a locking position.

Referring now to the drawings, wherein like reference characters designate like or corresponding parts throughout the several views, there is shown in Fig. 1, which illustrates a preferred embodiment, a male coupling member generally indicated at 11 and a complementary female coupling member generally indicated at 12.

The male member 11 comprises a tubular element having an end portion 13 of reduced outer diameter and adapted to receive thereover one end of a hose or the like which is to be secured thereto, as by means of hose clamps, not shown. The other end of said male member 11 is also provided with a reduced diameter portion 14 forming an abutment shoulder 15. The reduced diameter portion 14 is provided with interrupted threads or ribs on the periphery thereof comprising diametrically opposite quadrature thread sections and blank or cut-away sections 20 therebetween, so that this interrupted thread portion may be slipped into the complementary female nut member or screw box, and be threadedly locked by a 90° relative turn of said members.

The male member has a uniform axial passage 16 for the flow of fluids therethrough.

Diametrically opposite pin-lugs 17 and 18 are provided on the central portion 19 of said male member, the lug 17 having a pair of opposed flat faces 21 embraced by the bifurcated end 22 of handle 23 or lever arm. The two prongs of said bifurcation are pivoted to lug 17 by means of pin 24, the handle 23 being disposed longitudinally of said male member.

The extending prong ends 25, or resistance arms, are rounded to facilitate their sliding engagement with an initially tensioned leaf spring 26 that surrounds lug 17 and which is interposed between the resistance arms 25 and central portion 19 of said male member. The purpose of this spring 26 is to spring-load the handle 23 so as to resist a displacement of the handle from a horizontal engaged position. Said spring is provided with a slot 27, centrally thereof, to be received by the lug 17, the faces 21 of the lug engaging with the sides of the slot 27 to maintain the spring in a longitudinal operational position. The prong ends 25 are of a length to be freely pivoted from one side to the other of lug 17 without being obstructed by the spring, if and when the spring goes solid against the central portion 19.

The handle 23 is provided with an aperture 28 to be received by a locking lug on the female coupling member, hereinafter more fully described, and is further formed with a forwardly curved end 29 constructed and arranged to bear against said female coupling member to guard the handle from being accidentally caught and disengaged by branches, shrubs or the like, while the hose, to which this coupling member is attached, is being moved about or dragged along the ground.

The female member 12 is a tubular element having an axial passage 31 therethrough counterbored as at 32 thereby forming an inner shoulder 33. The inner periphery of said counterbore is provided with diametrically opposite quadrature thread sections 34, and blank or cut-away sections 30 therebetween, to receive and threadedly engage with the threaded sections on said male member. When the complementary male and female members are firmly threadedly engaged, abutment shoulder 15 of the male member engages with end edge shoulder 35 of the female member; and the end edge shoulder 36 of the male member abuttingly engages with the inner shoulder 33 of the female member.

Diametrically opposite pin-lugs 37 and 38 are provided on the head end 39 of said female member, the lug 37 having a pair of opposed flat faces 41 embraced by the bifurcated end 42 of handle 43. The two prongs or resistance arms of said bifurcation are pivoted to lug 37 by means of pin 44, the handle 43 being disposed longitudinally of said male member.

The handle 43 and its associated parts are constructed and arranged and function similarly to the handle 23 and associated parts on the male member. That is, the extending prong ends 40 are rounded to facilitate their sliding engagement with an initially tensioned leaf spring 45 that surrounds lug 37 and which is interposed between the resistance arms 40 and the head end 39 of said female member. Said spring 45 is provided with a slot 46, centrally thereof, to be slipped over lug 37, the faces 41 of the lug engaging with the sides of the slot 46 to maintain the spring in a longitudinal operational position. The prong ends 40 are of a length to be freely pivoted from one side to the other of lug 37.

The handle 43 is also provided with an aperture 47 to be received by locking lug 18 on the male member, and is further formed with a forwardly curved end 48 to bear against said male member or hose secured thereto, to guard the handle from being accidentally disengaged by objects thrust under the handle, as when the coupled members, and its attached hose, are dragged along the ground.

When the male and female members are firmly engaged, locking lug 38 and the aperture 28 are longitudinally aligned and space related to allow the handle 23 to be locked in position thereby; and similarly, locking lug 18 and the aperture 47 are longitudinally aligned and space related to allow the handle 43 to be locked in position thereby.

The rearward end portion 49 of said female member is adapted to receive thereover one end of a hose or the like which is to be secured thereto, as by means of hose clamps, or the like, not shown.

It is obvious that a gasket may be positioned between the confronting shoulders and edges to form a sealed joint.

Operation: To couple the members, the threaded portions 14 of the male member are aligned with the cut-away portions 30 of the female member, and inserted therein to the full depth. The handles 23 and 43, having been brought to their laterally extending position as shown in Fig. 2, are then grasped by the hands and a twisting torque applied therethrough to the coupling members. When the couplings are relatively angularly displaced 90°, the interrupted thread sections 14 and 34 are threadedly engaged and further relative displacement therebetween is stopped by the abutment of shoulder 15 against edge 34, and by the additional abutment of end edge 36 against inner shoulder 33.

Handle 43 is then pivoted so that its aperture 47 is received by and engages with locking pin 18. Spring 45 exerts a force against the resistance arms of said handle 43 to maintain the handle in its engaged position with pin 18.

Handle 23 is now pivoted over the female coupling, so that its aperture 28 is received by and engages with locking pin 38. Spring 26 exerts a force against the pivotal end of said handle 23 and resists a displacement thereof.

Consequently, rotational disengagement of the coupling members is prevented by the interaction of the handles and the locking lugs, and pivotal disengagement of the handles from the lugs is prevented by the leaf springs.

The characteristic features of this invention are coacting torque applying handles on the complementary parts of a coupling, locking means for said coupling including said handles, and associated leaf springs for resisting disengagement of said locking means.

Obviously many modifications and variations of the present invention are possible in the light of the above teachings. It is therefore to be understood, that within the scope of the appended claim, the invention may be practised otherwise than as specifically described.

What is claimed and desired to be protected by Letters Patent of the United States is:

A pipe coupling, comprising: a male tubular member and a complementary female tubular member provided with engageable interrupted threads, each member having diametrically opposite lugs disposed to be longitudinally aligned when the members are fully engaged, and each member having an annular shoulder to coact in abuttal when the members are engaged to provide liquid sealing for the coupling and for providing an engagement stop; a first handle pivotally connected as a first-class lever to one of the lugs on said male member, said handle being disposed and pivotally operative to be laterally extended and to longitudinally overlie each member, and having an aperture engageable with the companion aligned lug on the female member; a second handle pivotally connected as a first-class lever to a diametrically opposite lug on the female member when the members are fully engaged, said second handle being disposed and pivotally operative to be laterally extended and to longitudinally overlie each member, and having an aperture engageable with the companion aligned lug on the male member; and a compression spring mounted on each member operative to exert a force against the resistance arms of said handles to resist disengagement of the handles from their coacting lugs.

References Cited in the file of this patent

UNITED STATES PATENTS

| Number | Name | Date |
|---|---|---|
| 222,326 | Stevens | Dec. 2, 1879 |
| 620,821 | Abbey et al. | Mar. 7, 1899 |
| 758,985 | Liebel | May 3, 1904 |
| 893,554 | St. Onge | July 14, 1908 |
| 1,080,675 | Berg | Dec. 9, 1913 |
| 1,121,147 | Stiglich | Dec. 15, 1914 |
| 1,148,429 | Beach | July 27, 1915 |
| 1,233,750 | Butcher | July 17, 1917 |
| 1,469,009 | Overstreet | Sept. 25, 1923 |
| 1,841,890 | Hannon | Jan. 19, 1932 |